Figure 1:
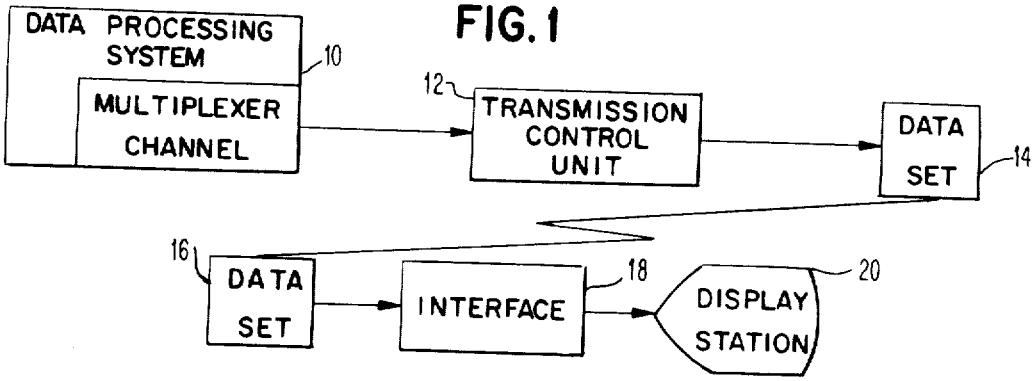
Figure 2:
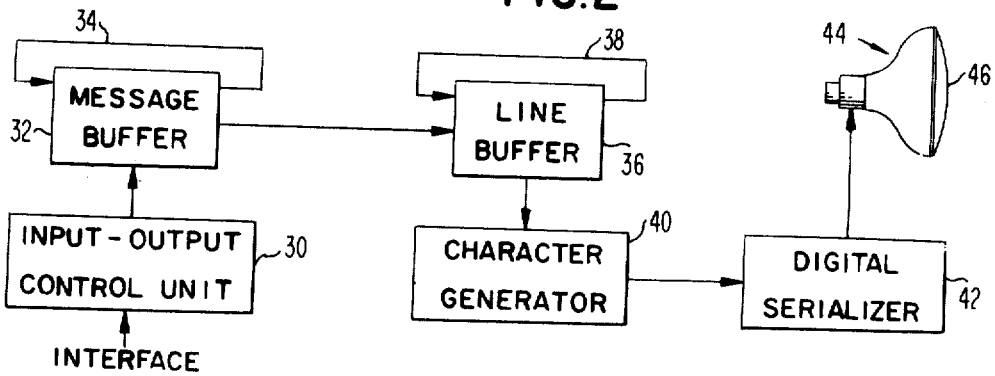
Figure 3:
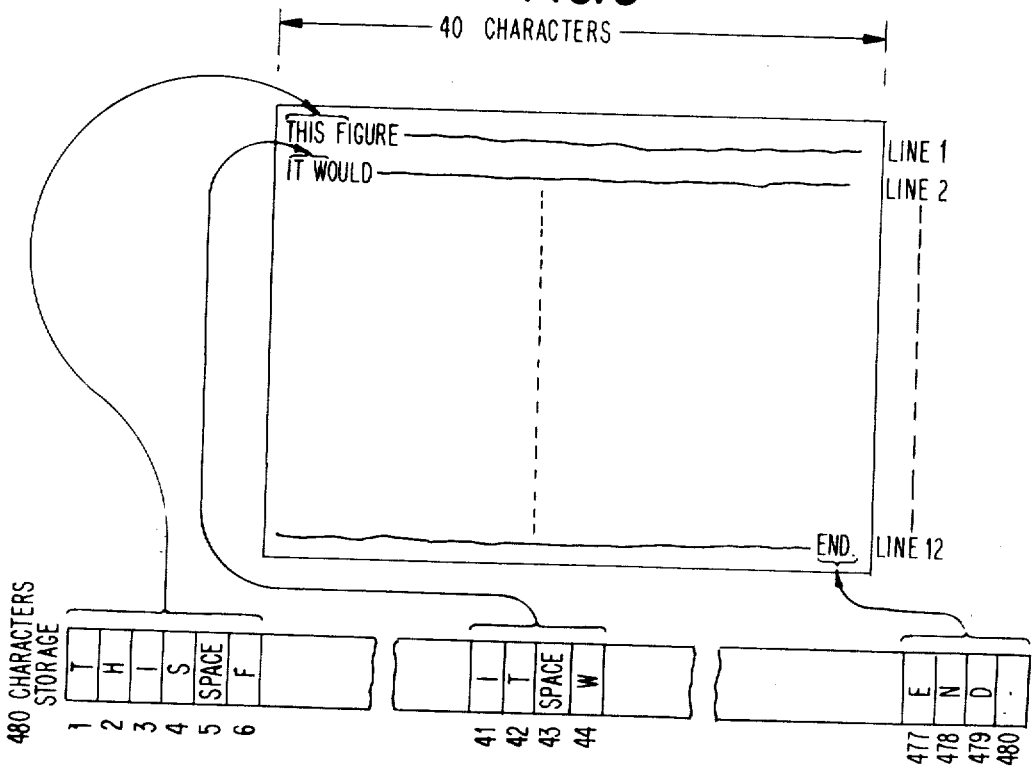
Figure 4:
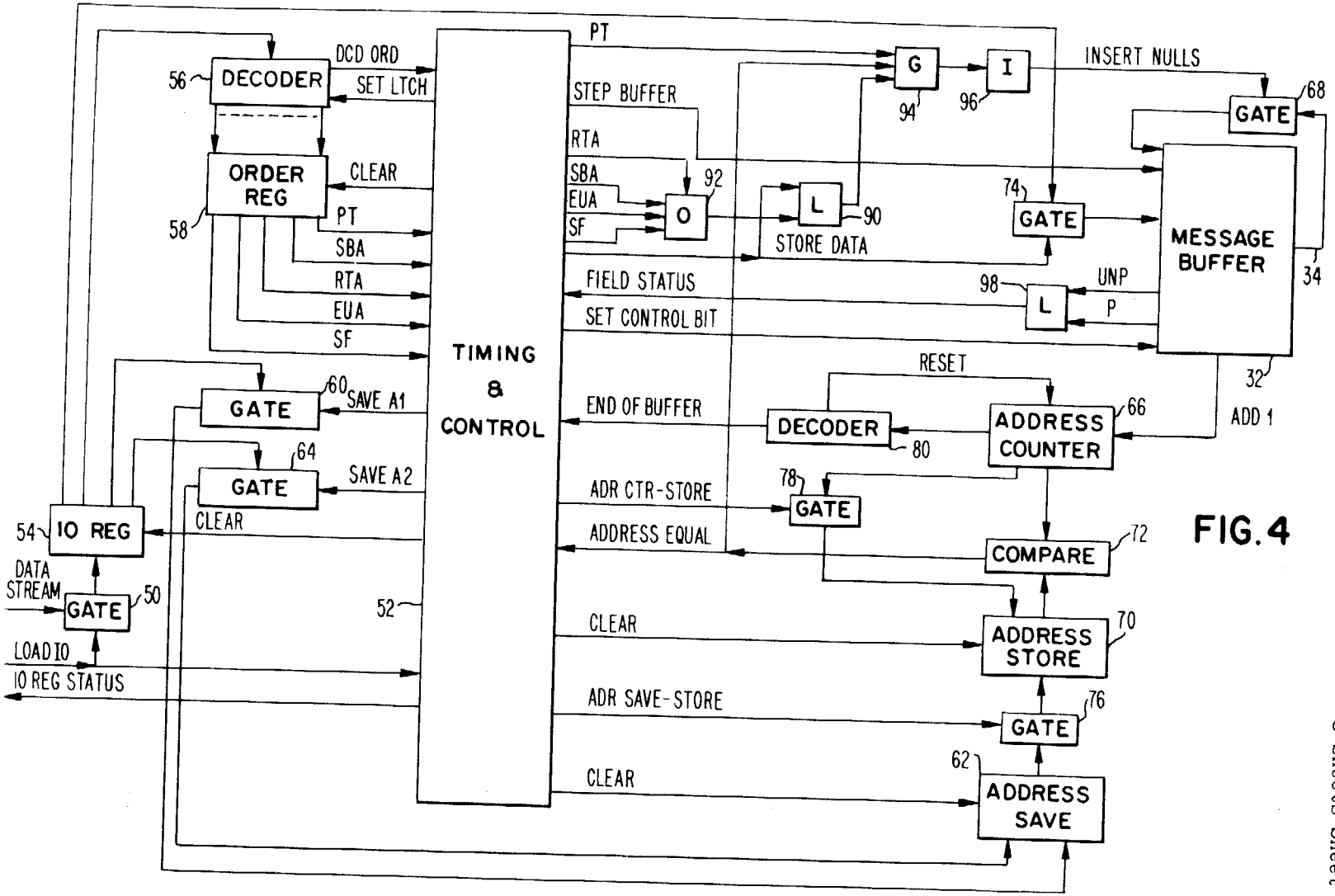
Figure 5:
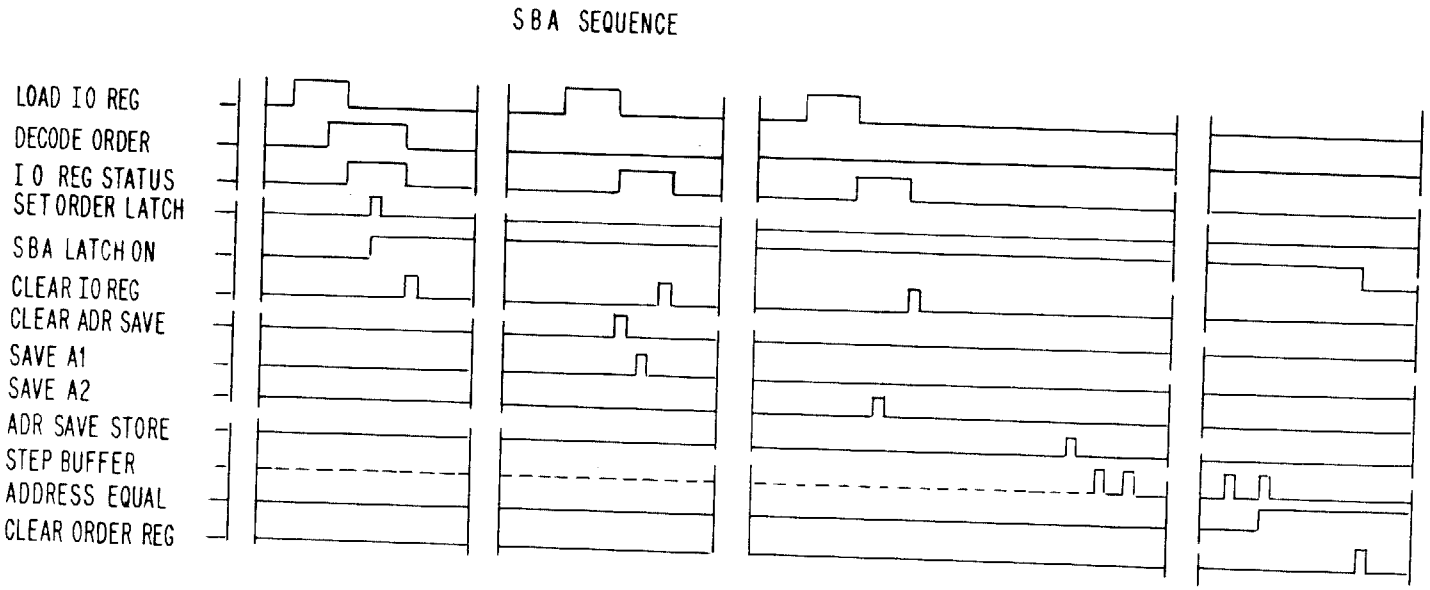
Figure 6:
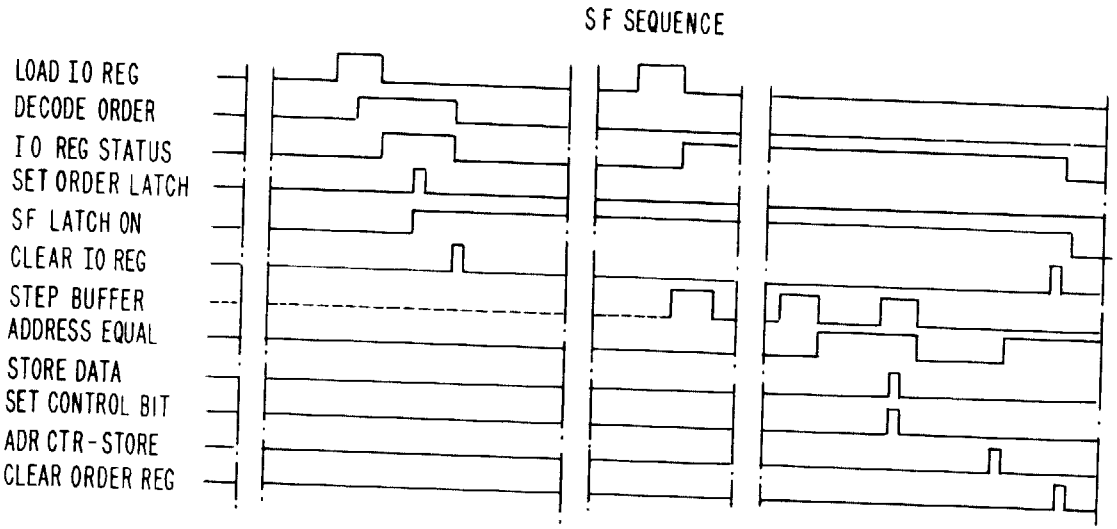
Figure 7:
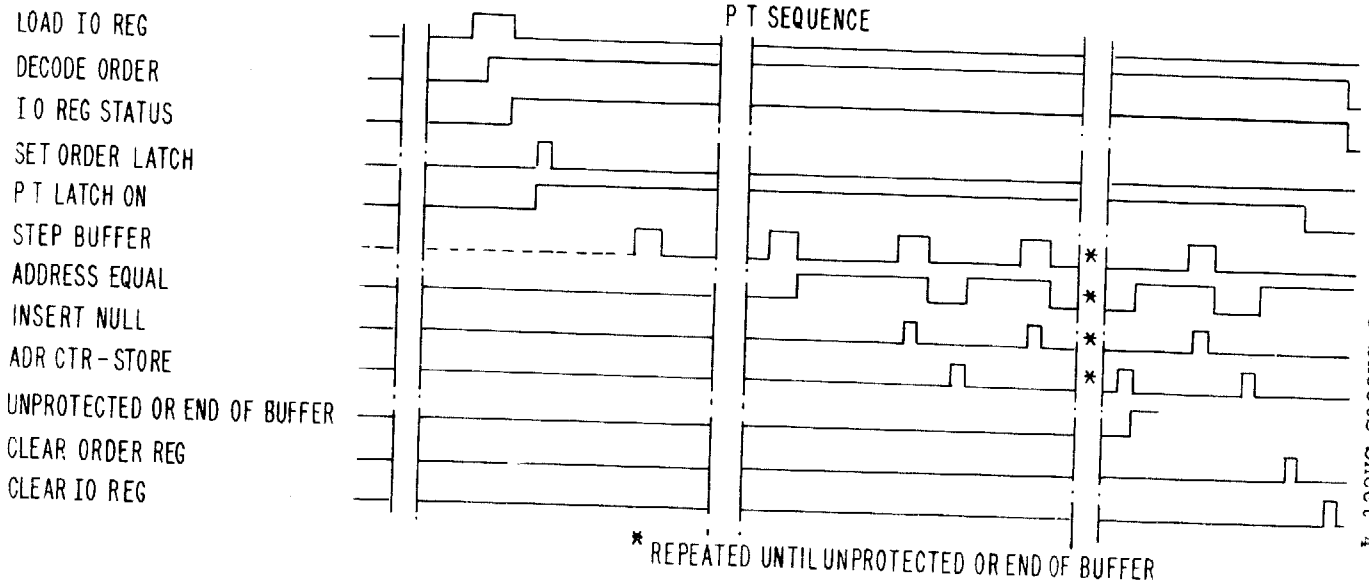
Figure 8:
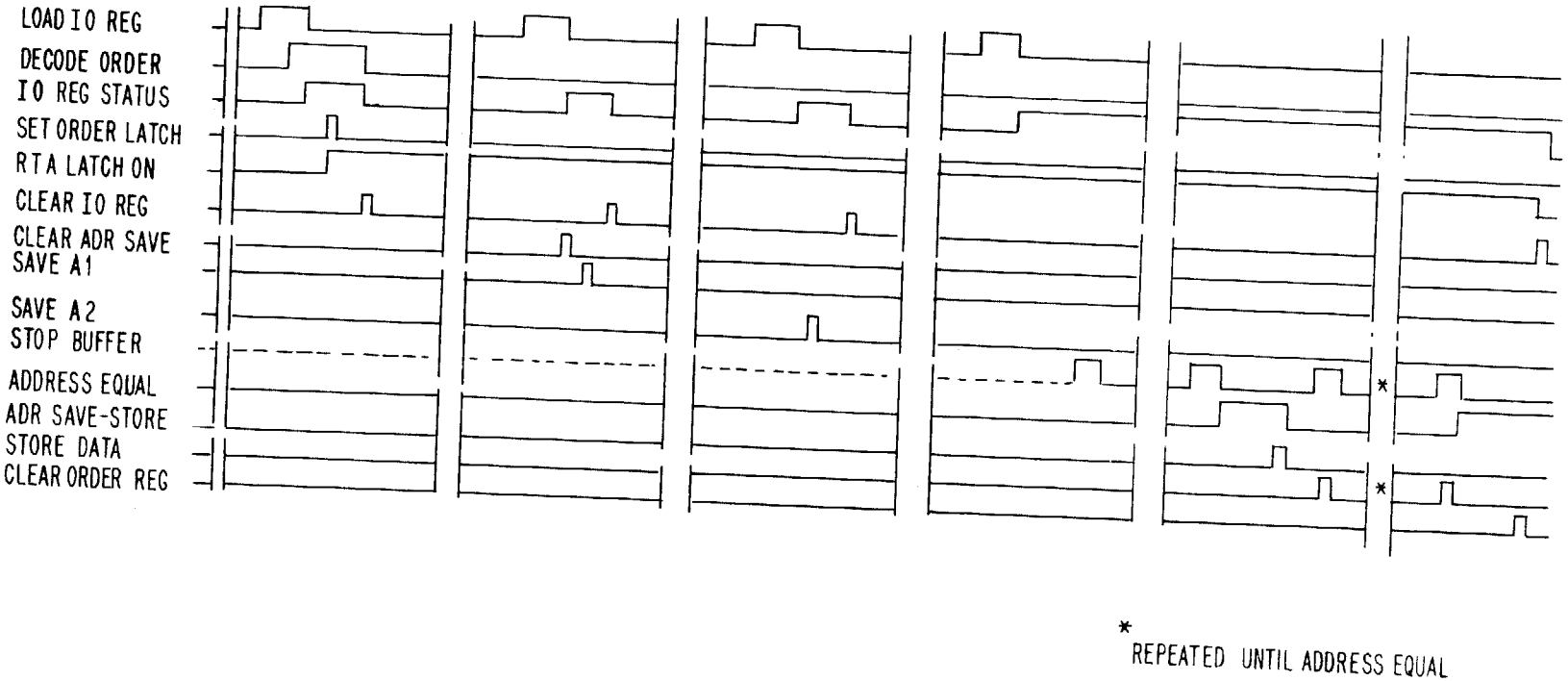
Figure 9:
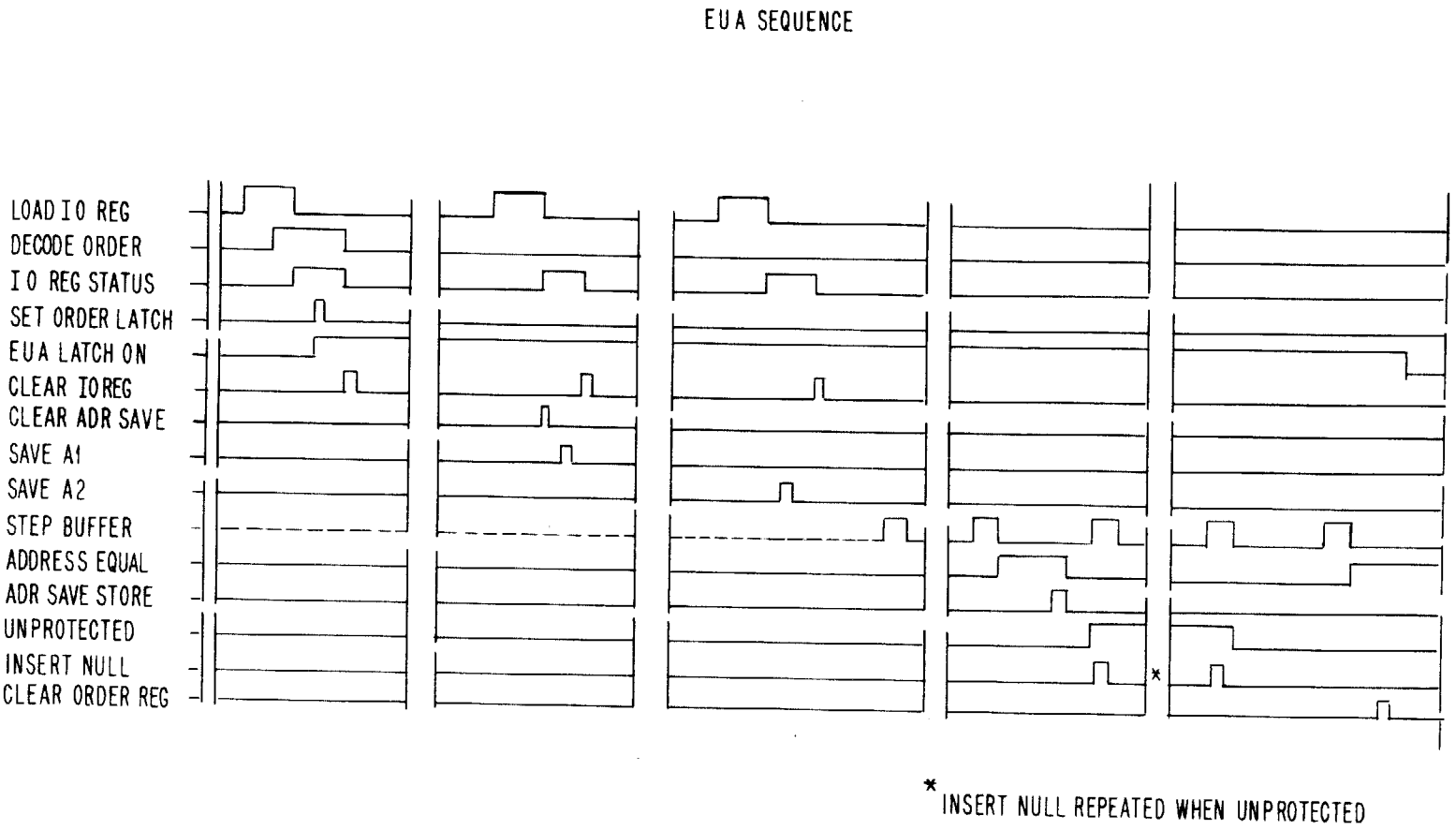
Figure 10:
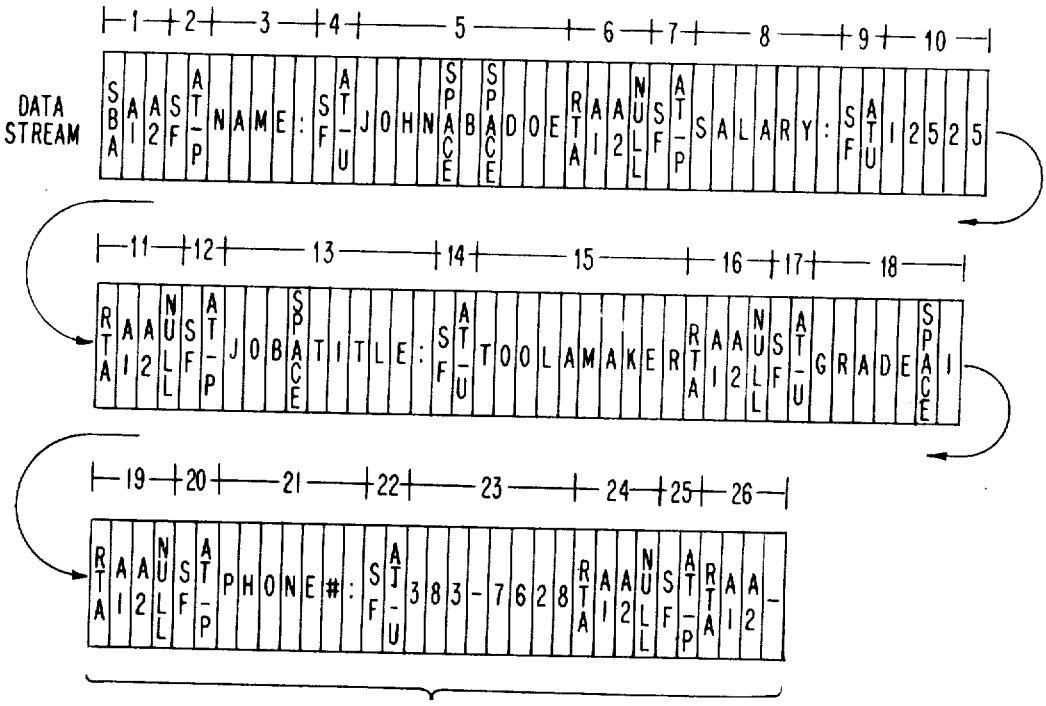
Figure 10:
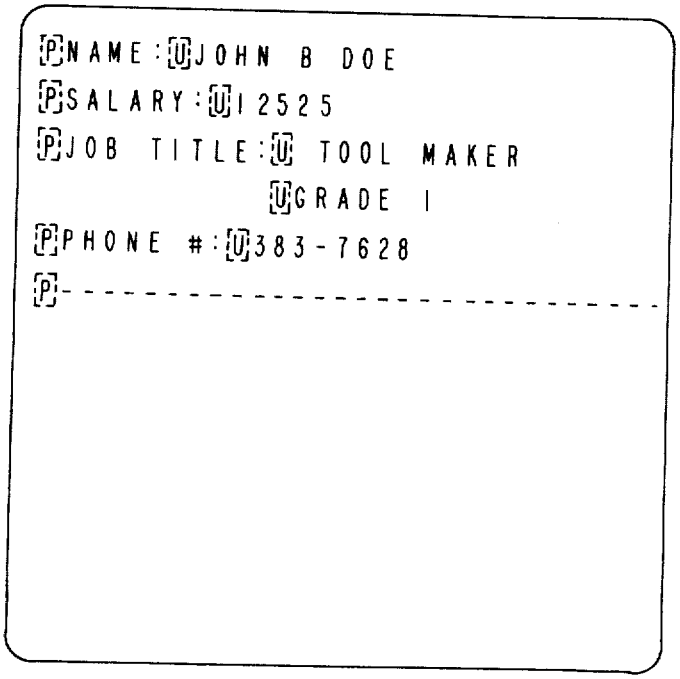
Figure 11:
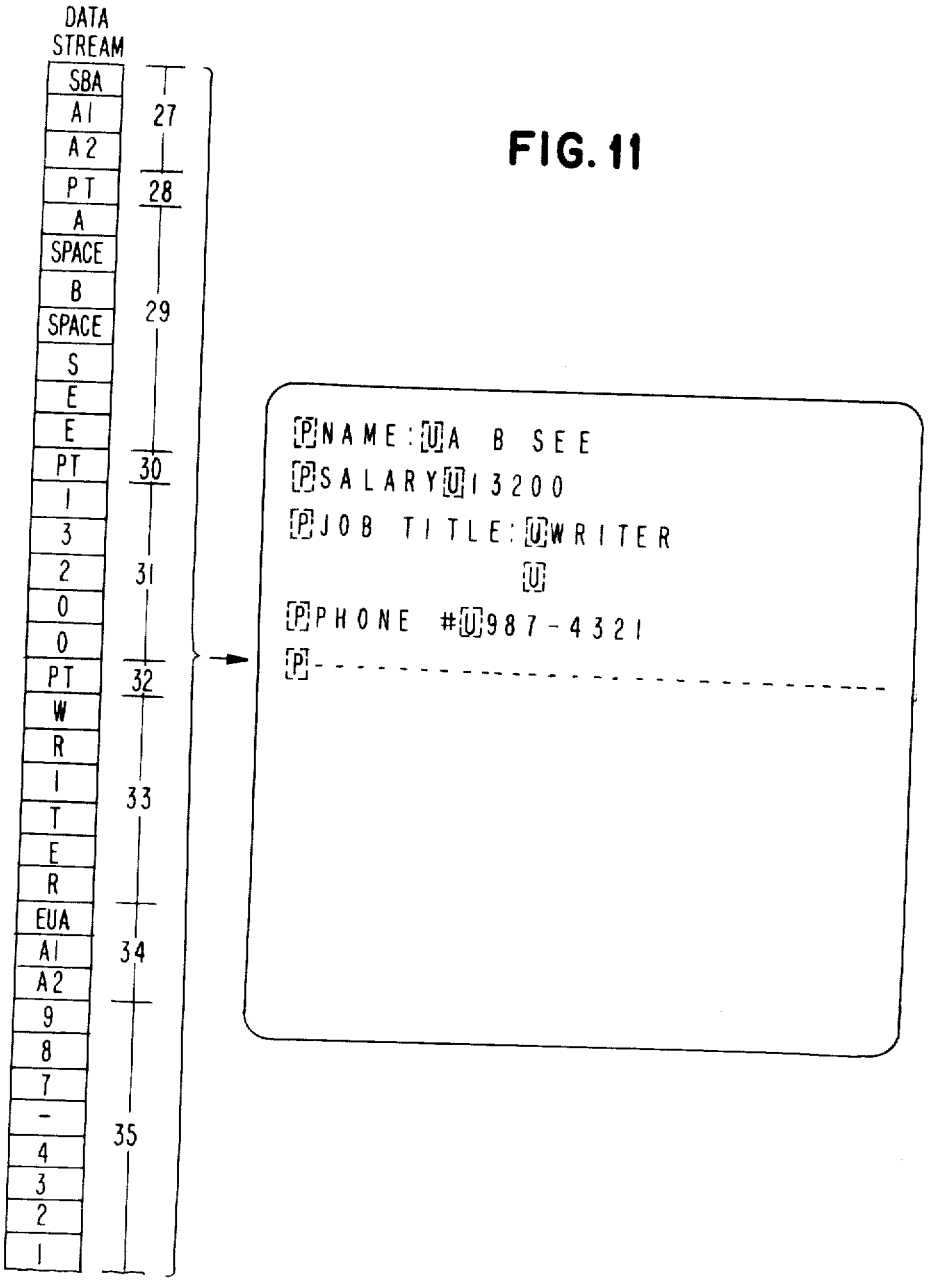

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 22, 1974

918 O.G. 1328

T918,012

COMPUTER TERMINAL MESSAGE CONTROL

Francis Michael Hartmann, Hurley, Richard Alfred Jones, Redhook, Theodore Edwin Larson, Saugerties, Kenneth Rogers McNary, Hyde Park, and James Theodore Zahorsky, Saugerties, N.Y., assignors to International Business Machines Corporation, Armonk, N.Y.

Filed Nov. 13, 1972, Ser. No. 305,744

Int. Cl. G06f *3/00*

U.S. Cl. 340—172.5

8 Sheets Drawing. 21 Pages Specification

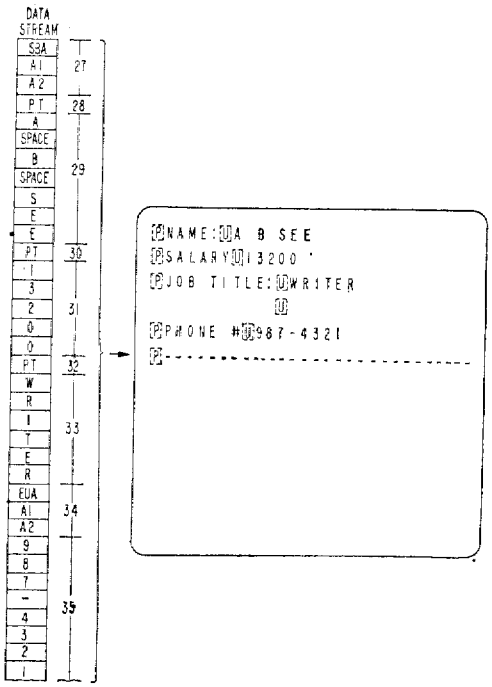

A terminal which includes an addressable message buffer for storing fields of data; the fields being defined as a group of consecutive characters starting with a field defining character followed by alphameric characters and terminated by a field defining character which defines the beginning of the next field. The field defining character defines an attribute of the field, i.e., whether the field is protected [P] from modification by a terminal operator or unprotected [U] and therefore available for modification or entry of data. The terminal responds to a data stream which includes a single program tab order. In executing this order, the current buffer address is advanced to the address of the first character location of the next unprotected field. If the order is issued following an alphameric or null character, null characters are inserted for all the remaining characters in the current field; otherwise, no null character insertion operation takes place.

COMPUTER TERMINAL MESSAGE CONTROL

Filed Nov. 13, 1972

COMPUTER TERMINAL MESSAGE CONTROL

Filed Nov. 13, 1972 8 Sheets-Sheet 2

COMPUTER TERMINAL MESSAGE CONTROL

Filed Nov. 13, 1972

RTA SEQUENCE